United States Patent [19]

Würl et al.

[11] Patent Number: 5,093,052
[45] Date of Patent: Mar. 3, 1992

[54] METHOD OF CONTROLLING INJECTION MOLDING MACHINE WITH HYDRAULIC LOADS

[75] Inventors: Ernst Würl, Höttingen; Helmut Schreiner, Nuremberg, both of Fed. Rep. of Germany

[73] Assignee: Mannesmann Aktiengesellschaft, Dusseldorf, Fed. Rep. of Germany

[21] Appl. No.: 538,382

[22] Filed: Jun. 14, 1990

[30] Foreign Application Priority Data

Jun. 14, 1989 [DE] Fed. Rep. of Germany ....... 3919823

[51] Int. Cl.⁵ .............................................. B29C 45/82
[52] U.S. Cl. ................................. 264/40.1; 264/40.5; 425/145; 425/149; 425/150
[58] Field of Search ................... 264/40.1, 40.5, 328.1; 425/145, 149, 150, 589, 591, 594, 595

[56] References Cited

U.S. PATENT DOCUMENTS

| | | | |
|---|---|---|---|
| 3,422,648 | 1/1969 | Lemelson | 264/174 |
| 3,698,846 | 10/1972 | Leutner | 425/149 |
| 3,721,512 | 3/1973 | Ma et al. | 425/149 |
| 3,893,792 | 7/1975 | Laczko | 264/40.5 |
| 4,120,922 | 10/1978 | Lemelson | 264/328.12 |
| 4,257,755 | 3/1981 | Lemelson | 264/327 |
| 4,565,511 | 1/1986 | Ramisch | 264/328.6 |

FOREIGN PATENT DOCUMENTS 243668  3/1987  German Democratic Rep. ..................... 425/149

Primary Examiner—Jan H. Silbaugh
Assistant Examiner—Brian J. Eastley
Attorney, Agent, or Firm—Cohen, Pontani & Lieberman

[57] ABSTRACT

An injection molding machine for manufacturing plastic moldings contains a plurality of hydraulic loads for individual subassemblies including a closing unit, an injection unit, an ejector and cores. A plurality of the pumps are respectively connected to the hydraulic loads. At least one alternating-current servomotor is provided for driving the pumps. In a method of controlling hydraulic drives of the foregoing machine, the measured value of a subassembly is detected and compared with a desired value; any deviation detected thereby is converted into a desired velocity value. The speed of rotation of an associated motor is then adjusted, via a servodrive module, in response to the mentioned desired velocity value.

3 Claims, 4 Drawing Sheets

METHOD OF CONTROLLING INJECTION MOLDING MACHINE WITH HYDRAULIC LOADS

BACKGROUND AND SUMMARY OF THE INVENTION

The present invention relates to an injection molding machine for manufacturing plastic moldings and including a plurality of hydraulic loads for individual subassemblies, and also to a method of controlling hydraulic drives of the foregoing type of injection molding machine.

From EP 0,201,610 A1 an injection molding machine is known in which a servomotor drives a toggle-lever closing unit. In that case, the motor acts via a chain on the nut of a ball spindle.

With that construction, a linear movement is produced mechanically by rotation, with the disadvantage of unavoidable wear of the mechanical parts. In addition, the speed of rotation of the drive unit is limited in order to avoid damage to the ball-spindle system and in order to prevent loud operating noises.

From Federal Republic of Germany OS 3,731,021 an injection molding machine with hydraulic loads of individual subassemblies is known. The hydraulic systems of such machines ordinarily have a central pressure-producing station in which an electric motor drives a fixed-displacement pump and the pressure and volume control of the hydraulic system is effected by valves.

In addition to the annoyance by noise due to the continuous operation of motor and pump, such drives of injection molding machines have the disadvantage of consuming a large amount of energy. In addition, the control behavior of these hydraulically operated injection molding machines is also relatively sluggish, even upon the use of servovalves and control pumps.

It is an object of the present invention to provide hydraulic drives and a method of controlling said drives in injection molding machines which, while being of compact construction, move the individual subassemblies with strong power, rapidly and in noise-reducing fashion, as well as with less consumption of energy.

The foregoing object is achieved by an injection molding machine for manufacturing plastic moldings in accordance with the invention. Such machine comprises a plurality of hydraulic loads for individual subassemblies including a closing unit, an injection unit, an ejector and cores. A plurality of pumps are respectively connected to said hydraulic loads; and at least one alternating-current servomotor is provided for driving the pumps.

In a method for controlling hydraulic drives of the foregoing injection molding machine, a measured value of a subassembly is detected. Such measured value is compared with the desired value, and any deviation detected thereby is converted into a desired velocity value. The speed of rotation of an associated motor is then adjusted, via a servodrive module, in response to the desired velocity value.

The individual loads are connected directly to a pump which is driven by a servomotor. A uniform drive concept is produced since the drives of all subassemblies are driven hydraulically regardless of whether they perform a main function or a secondary function.

The energy required for driving the hydraulic loads is produced only when required since the servomotor can operate in a so-called stop-and-go mode. The work energy produced by the pumps is fed in simple fashion to the loads by pipe lines, without intermediate switching of hydraulic control elements such as directional or relay valves, and converted into linear motion.

Installation of these drives in existing drive systems is possible without any particular expense.

The pre-tensioning pressure required in the closed hydraulic system can be maintained in a structurally simple manner by pressure-maintaining pumps or by standardized accumulators. The transmission of force from the producer to the load is effected with extremely high speed and is not limited by mechanical parts. The result is a cycle time which is much shorter than that of electrical-mechanical injection molding machines.

The hydraulic system is almost free of wear. The mechanical parts used have self lubrication as a result of the fluid used, i.e. oil. In addition to this, hydraulic systems are not as strong as a mechanical system, so that extreme load peaks are avoided. Nevertheless, these hydraulic systems are of high rigidity which permit reproduceable values with respect to the path or force. This advantage is further increased by the direct transfer of power within the closed hydraulic circuit and therefore without the disturbing intermediate switching of valves and the like.

The number of structural parts necessary for the loads of the injection molding machine can be reduced in advantageous fashion or, for the same number, can be replaced by simpler parts. Thus a servomotor including a subcontrol circuit can be replaced by simple switchable clutches which are arranged between motor and pump. The advantage of the pump size which is adapted to the subassembly is retained thereby.

Instead of the switchable couplings, more than one pump can, in another advantageous arrangement, be connected to a servomotor.

By the use of variable displacement pumps, the volumetric flows of the loads of the individual subassemblies can be freely adjusted, both in volume and in direction. The control system of these standardized variable displacement pumps is of simple construction and is adapted to the control system of the servomotors.

The high dynamics which the hydraulics have as a result of the system is further supported by the procedure upon the regulation of the injection molding machine of the invention. Within a sub-system, namely a position or force control circuit, the measured values ascertained on the corresponding subassembly are controlled and converted into a velocity value. Within the control circuit of the drive motor, this velocity value is used as a desired value and is compared directly with the actual speed of rotation of the pump shaft and adjusted by a servovalve module in case of deviation.

This method of control permits a rapid analog response to changes in the actual behavior of the subassemblies.

BRIEF DESCRIPTION OF THE DRAWING FIGURES

Examples of the invention are shown in the accompanying Figures, in which.

DETAILED DESCRIPTION OF THE PREFERRED EMBODIMENTS

Figure 1:
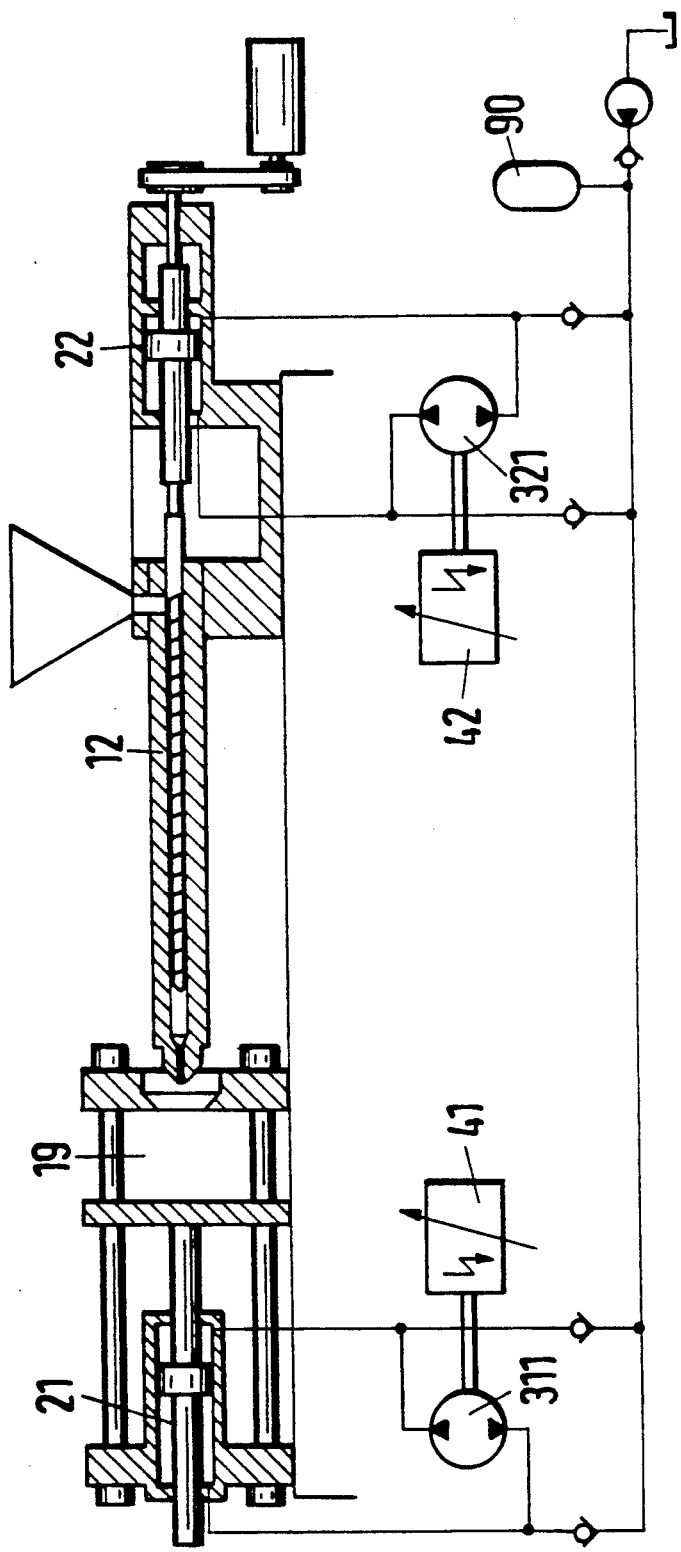
FIG. 1 is a partially schematic view of an injection molding machine for manufacturing plastic moldings in accordance with the invention.
Figure 2:
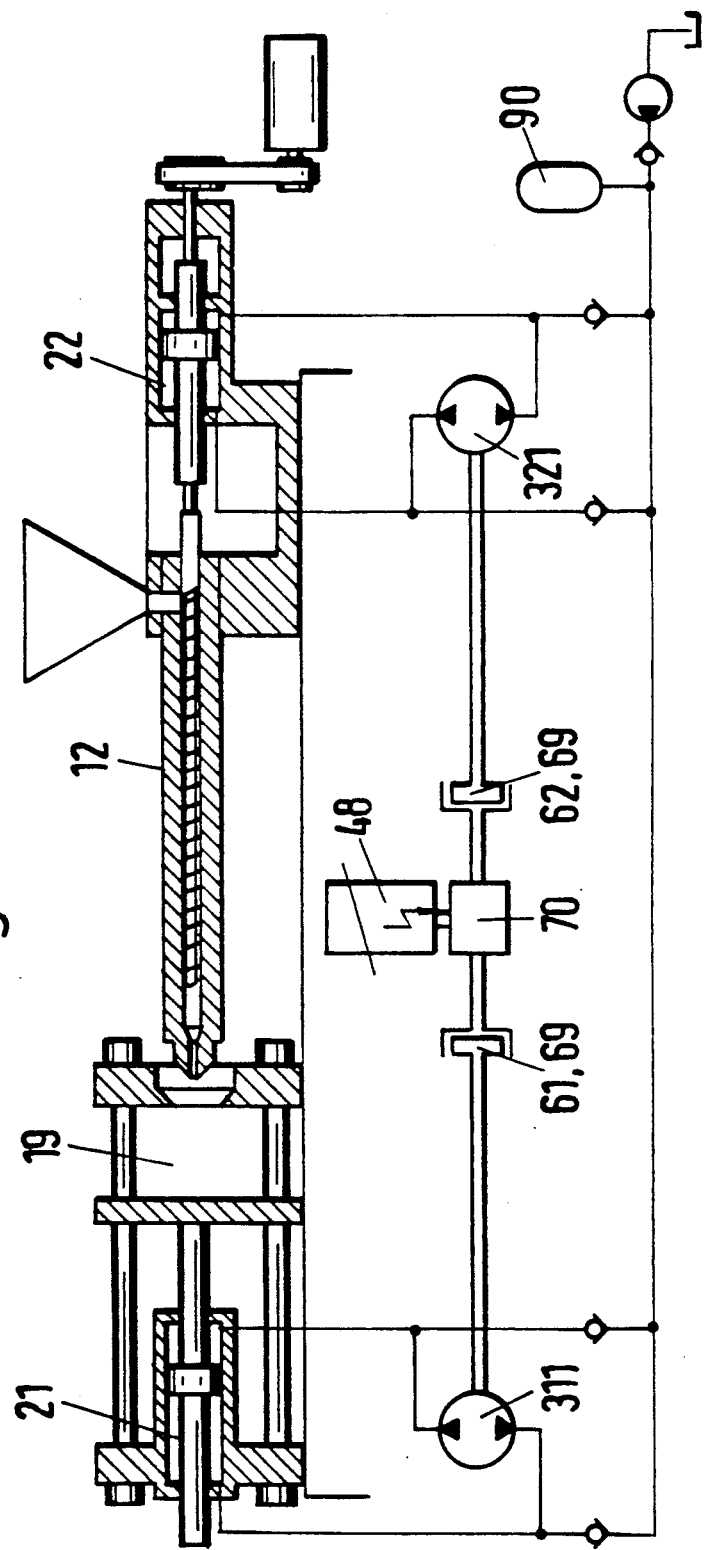
FIG. 2 is a view similar to FIG. 1 but showing a different embodiment of the invention.
Figure 3:
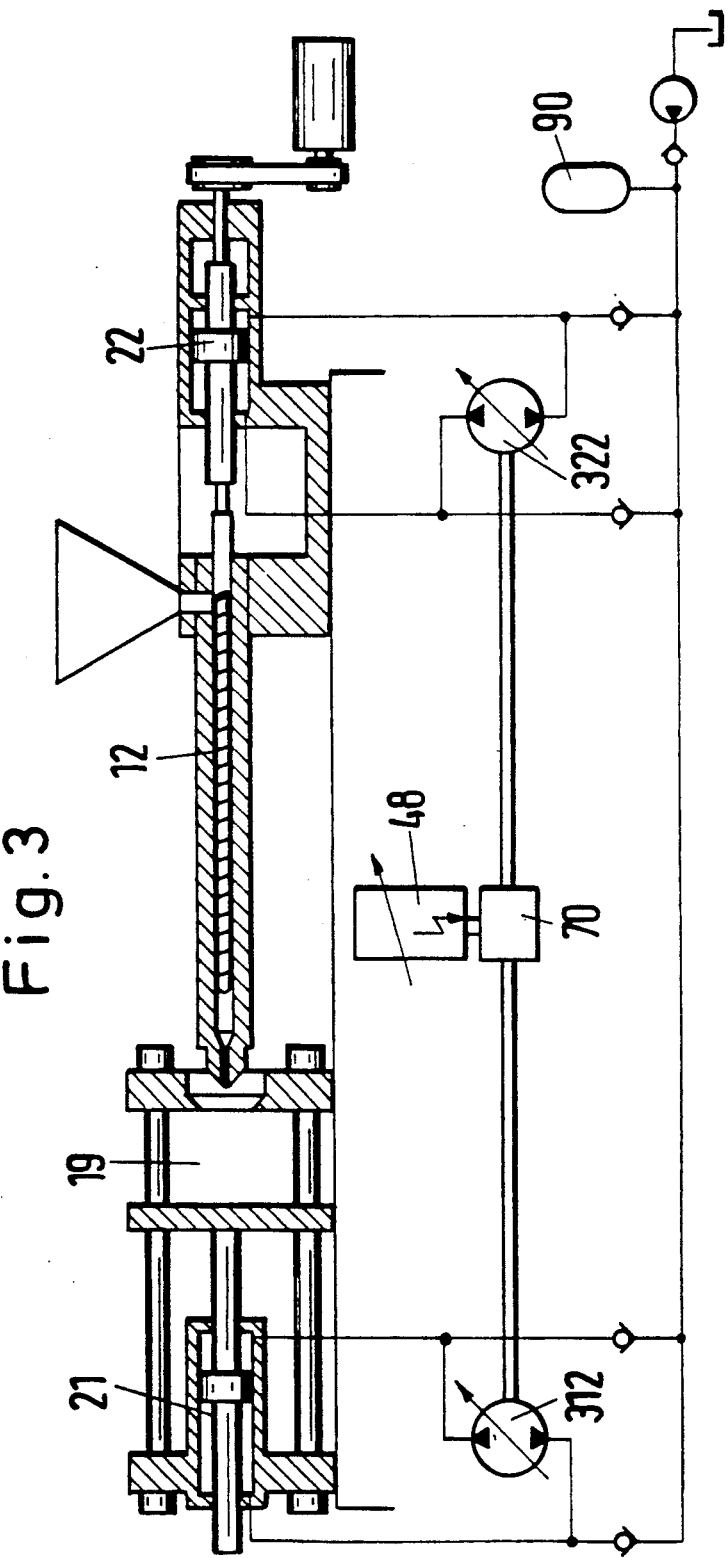
FIG. 3 is a view also similar to FIG. 1 but again showing a different embodiment of the invention.

FIGS. 1 to 3 show an injection unit 12, as well as a closing unit 19 with the corresponding hydraulic loads, the piston/cylinder units 21, 22. A pressure accumulator 90 is connected to the closed hydraulic system.

In FIGS. 1 and 2 the hydraulic loads 21, 22 are foreconnected with the fixed-displacement pumps 311 and 321.

In FIG. 1, the fixed-displacement pumps 311 and 321 are connected independently of each other to the motors 41 and 42.

In FIG. 2 the fixed-displacement pumps 311 and 321 are connected to the motor 48 via structures 61 and 62 and a power take-off 70. The clutches 61, 62 can be switched from the outside by a clutch control 69.

In FIG. 3 a motor 48 is provided which is connected by the power take-off 70 to variable displacement pumps 312 and 322.

Figure 4:
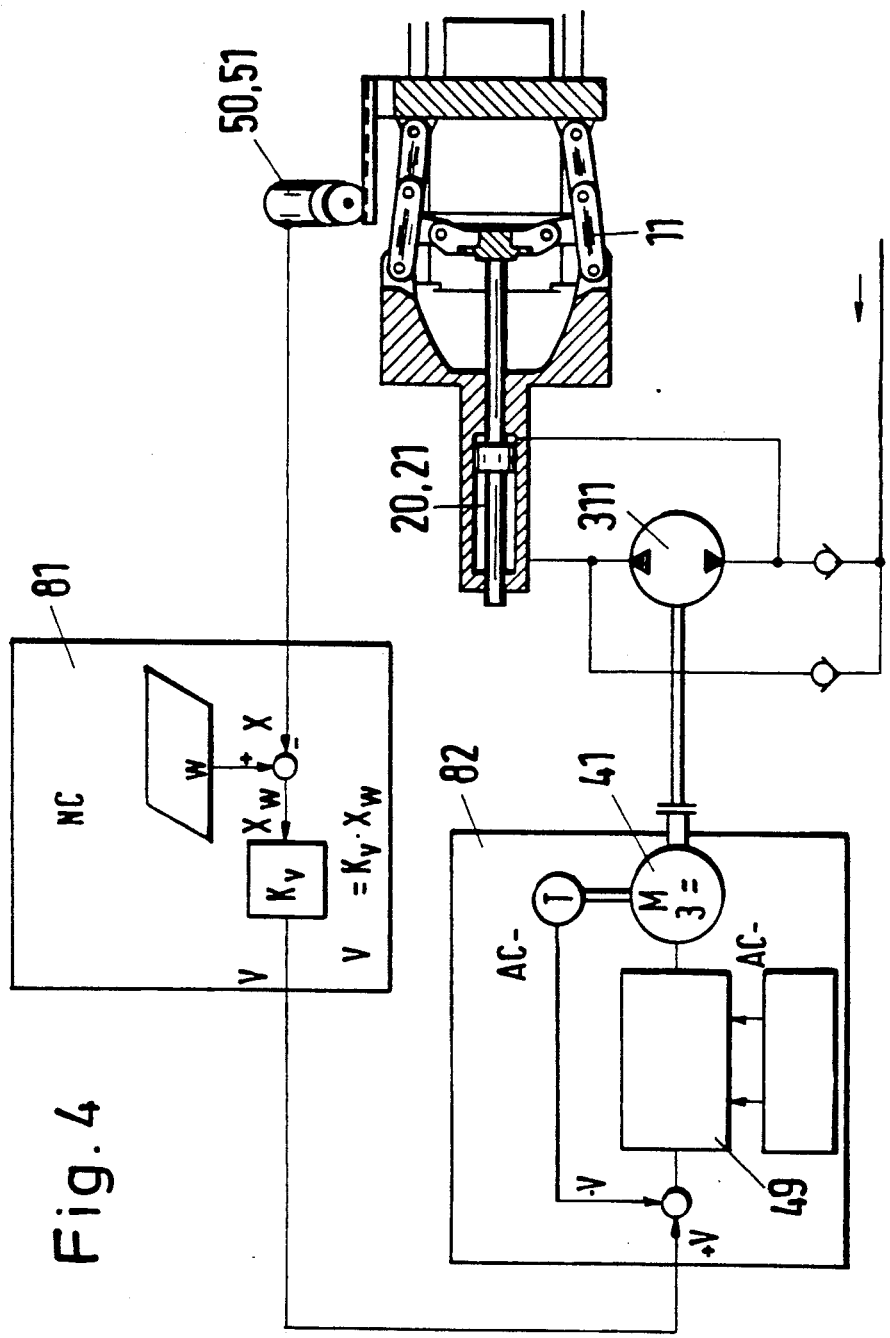
FIG. 4 illustrates a feedback control system for adjusting the speed of a servomotor in response to measured values from a subassembly.

FIG. 4 shows the fixed-displacement pump 311 which is connected to a hydraulic load 20, namely the piston/cylinder unit 21, which moves the closing unit, which is developed as toggle lever 11. This position of the closing unit 11 is detected by measurement elements 50, namely the position recorder 51.

The position value x, after detection, is fed to the position control circuit 81, compared with the desired value w, and delivered as speed value v. This value v is fed as a desired speed value to a speed control circuit 82 and compared with the existing speed of rotation of the motor 41 and, in the event that it differs, controlled by means of a servodrive module 49.

It should be understood that the preferred embodiments and examples described are for illustrative purposes only and are not to be construed as limiting the scope of the present invention which is properly delineated only in the appended claims.

What is claimed is:

1. A method of controlling hydraulic drives of an injection molding machine for manufacturing plastic moldings, said machine comprising a plurality of hydraulic loads for individual subassemblies including a closing unit, an injection unit, an ejector and cores, said method comprising the steps of:

detecting a measured value of a parameter at a subassembly;

comparing said measured value with a desired value of said parameter;

converting any difference deviation resulting from said comparing between said measured value and said desired value of said parameter into a desired velocity value; and adjusting a rotational speed of a motor, in response to said desired velocity value input into a servodrive apparatus associated with said motor, said motor controlling said hydraulic loads, to obtain said desired value of said parameter at said subassembly.

2. A method according to claim 1, wherein said step of adjusting the rotational speed of said motor comprises comparing an actual rotational speed of said motor with a desired rotational speed of said motor and controlling the rotational speed of said motor in response to the result of said comparison.

3. The method according to claim 1, wherein said parameter at said subassembly is selected from the group consisting of position and force.

* * * * *